April 28, 1942.   C. J. CRANE ET AL   2,280,798
PANORAMIC SEXTANT
Filed March 14, 1940   3 Sheets-Sheet 2

INVENTORS
CARL J. CRANE
SAMUEL M. BURKA
BY
ATTORNEYS

April 28, 1942. C. J. CRANE ET AL 2,280,798

PANORAMIC SEXTANT

Filed March 14, 1940 3 Sheets-Sheet 3

INVENTORS
CARL J. CRANE
SAMUEL M. BURKA
BY
ATTORNEYS

Patented Apr. 28, 1942

2,280,798

UNITED STATES PATENT OFFICE 2,280,798

PANORAMIC SEXTANT

Carl J. Crane and Samuel M. Burka,
Dayton, Ohio

Application March 14, 1940, Serial No. 323,964

18 Claims. (Cl. 88—2.2)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to improvements in optical instruments for the measurement of the azimuth and the altitude of celestial and terrestrial objects. Basically the invention relates to sextants in which optical and mechanical means are utilized for measuring both horizontal and vertical angles. Reference is made to co-pending application Ser. #381,474 which has eventuated into Patent No. 2,266,741 and of which the subject matter of this application is an improvement.

It is well known that manifold difficulties are experienced at the present time in using the conventional hand-held sextants or octants aboard aircraft. These difficulties are derived principally from the inability of the user to hold the instrument steadily or to obtain, from within an enclosed airplane, a view of essential celestial or terrestrial objects.

The primary object, therefore, of this invention is to provide a sextant of novel construction and arrangement whereby it is adapted to be installed and used aboard aircraft for making observations and measurements of celestial and terrestrial objects without the difficulties and inconvenience attendant upon the use of the conventional hand-held sextant. An object of the invention is to provide an instrument which, in addition to its use as a sextant, can be used for steering a course, preserving a heading, and measuring the relative bearing of a star or other object from the airplane.

To this end, the invention provides a sighting device mounted within an airplane or other vehicle with its entrance portion exteriorly of the vehicle and its eyepiece portion interiorly of the vehicle. Reflector means, adjustable in altitude, are associated with the entrance portion for reflecting the image of an observed object into the sighting device and the latter is rotatable in azimuth to give a view in all directions. Means are provided for measuring or indicating the altitude and bearing of the observed object. The device is adjustably mounted in the airplane by means permitting tilting of the instrument to compensate for changes in the altitude of the craft during observation periods. This feature facilitates levelling and steadying of the instrument when making an observation.

The invention, in addition to providing means which will permit of observations being made on objects exterior to an airplane from a reasonably confined position within the airplane, such not now being possible with the conventionally used hand-held sextants due to the many structural and other obstacles encountered in and about the airplane, provides also a plurality of eyepieces of different magnification.

Other objects and advantages of the invention will become apparent from the following detailed description of invention, reference being had to the accompanying drawings wherein.

Figure 1:
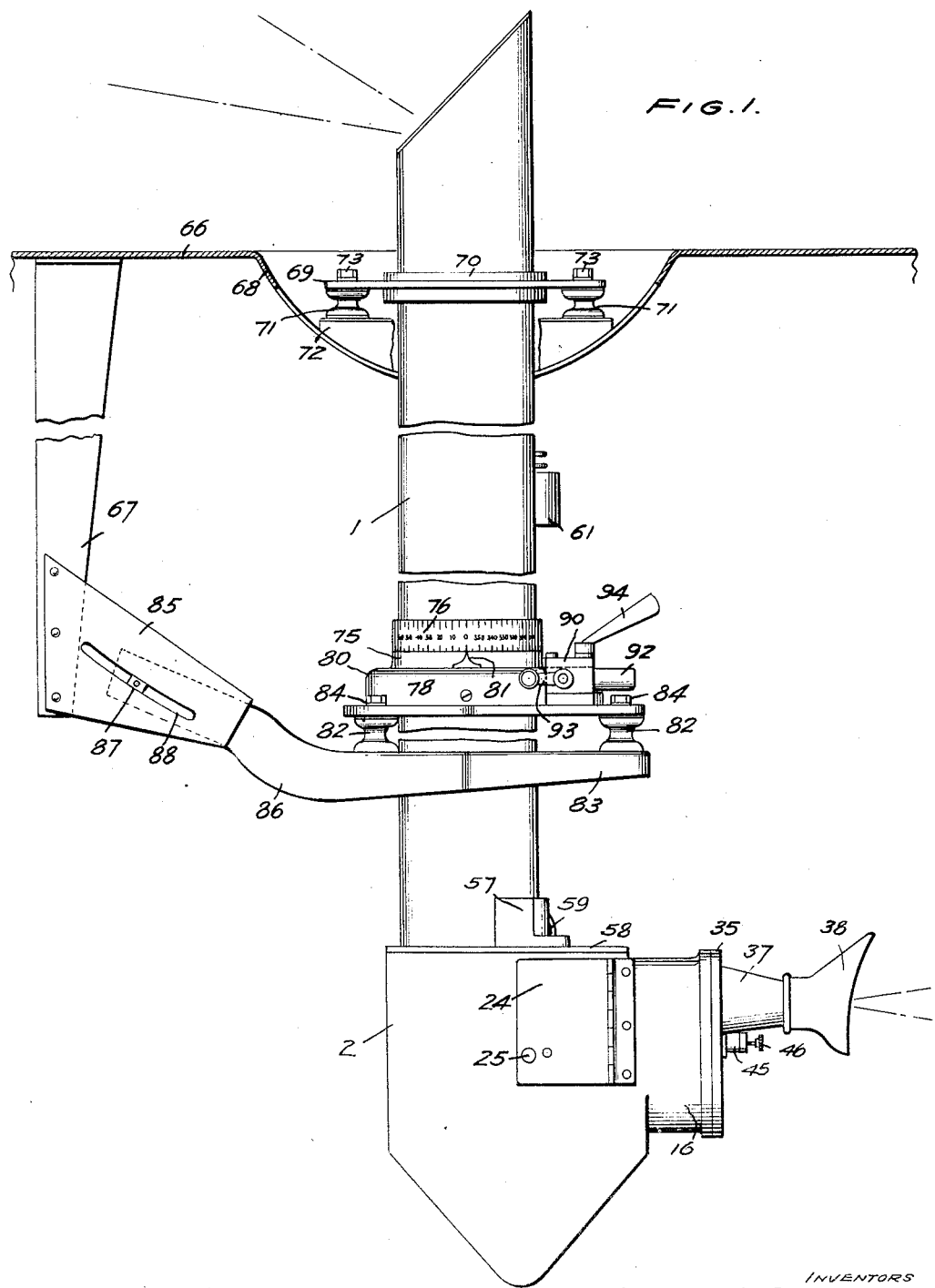
Fig. 1 is a view illustrating the installation of the instrument in a vehicle.

The optical units of the instrument are enclosed within a casing consisting of an elongated sighting tube 1 and a housing 2, the latter being secured over one end of the tube which has its other end obliquely disposed as shown. Secured within the tube between the obliquely disposed end thereof and the housing 2, are three longitudinally spaced tubular members or short barrels 3, 4 and 5. The outermost barrel 3 has its outer end obliquely disposed in conformity with the corresponding outer end of the tube 1 and serves as a support or holder for a cover glass 6 and a reflecting prism 7. The tube is thus provided at its obliquely disposed end with a window through which luminous rays from a distant object will pass and fall upon the prism from which they are reflected down the tube. The intermediate barrel 4 is fitted with lenses 8 and 9 of the objective and a spacer 10 between the lenses. The focal plane of the objective is represented by a dotted line 11. The lowermost barrel 5 is fitted with a lens 12 having one of its principal focal planes at 11, and a lens 13 of the same focal length as lens 12 but having its focal plane at 14. The lenses 12 and 13 are separated by a spacer 15 but since the rays between these lenses are in parallel pencils the extent of separation of the lenses is not critical. They may be close together or separated a comparatively large amount without changing any of the optical characteristics such as field of view, magnification, etc. This permits the instrument to be made of any overall length width within wide limits. Spacers of varying lengths may be inserted between lenses 12 and 13 or other suitable construction may be employed to obtain the desired spacing between the lenses, such spacing involving no change in the rest of the optical system.

The housing 2 has an integral circular extension or drum 16 to receive the eyepiece units of the instrument, the axis of the drum being at right angles to the axis of the tube 1. The interior of the housing is divided into a reflector chamber 17 in line with the housing end of the tube, and a bubble-cell chamber 18 located between the reflector chamber 17 and the drum extension 16. The bubble-cell chamber is open to the reflector chamber through an orifice 19 and open to the drum through an orifice 20. The reflector chamber contains a pair of mirrors 21 and 22 arranged as shown so that the light rays from lens 13 fall upon the mirror 21, are reflected therefrom to the mirror 22 and from the latter are reflected to the bubble-cell chamber 18. Access to the chamber 18 for installing or removing the bubble-cell 23 is permitted through an opening in a side of the housing which normally is covered by a hinge door or cover plate 24. Suitable means including the nut 25 are provided for holding the door 24 closed, and a spring 26 on the inner side of the door engages a projection 27 on the cell and holds the latter in position. When the door is opened, the bubble-cell can be readily removed or replaced.

Figure 2:
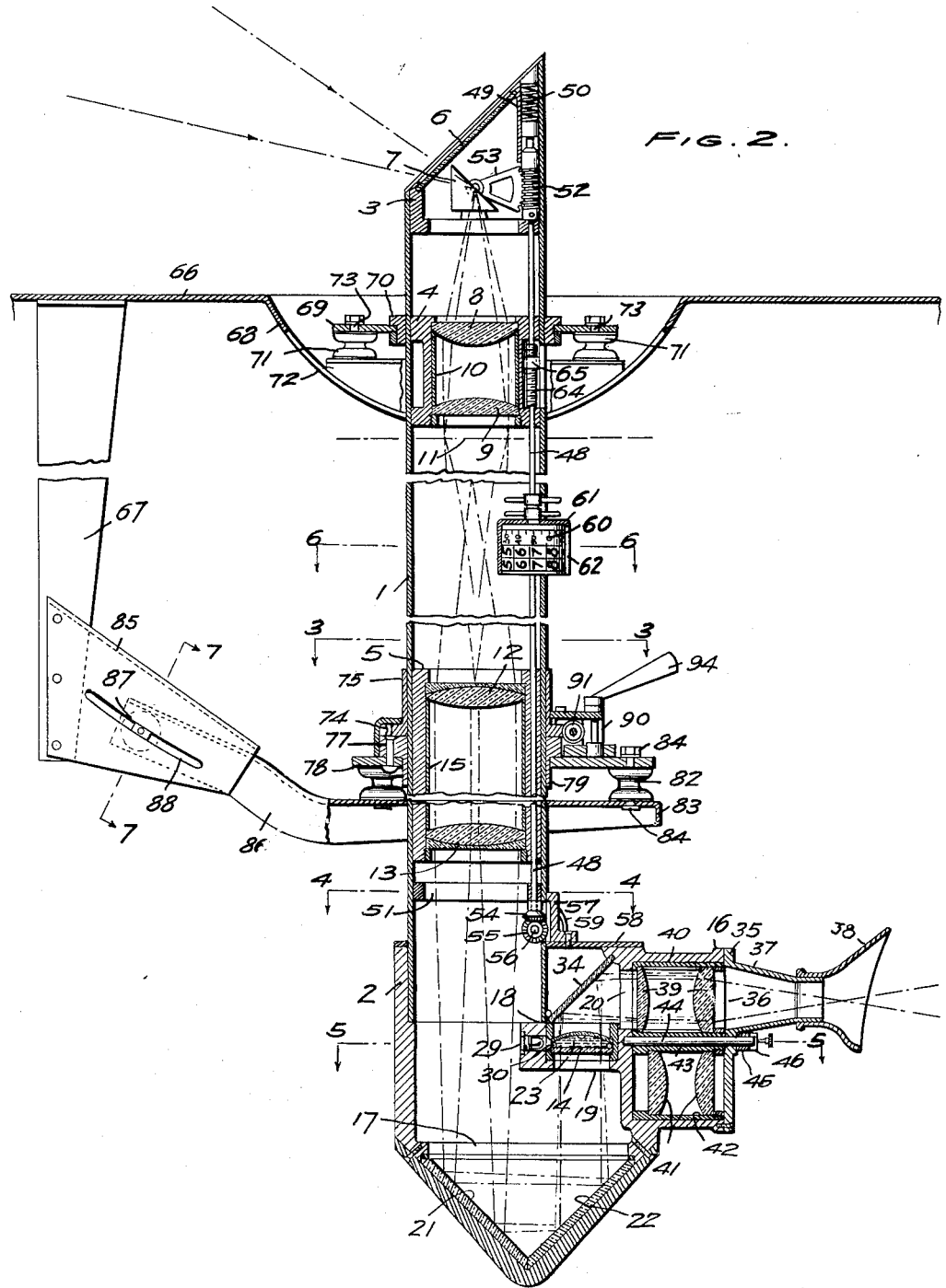
Fig. 2 is a view similar to Fig. 1; the instrument being shown in longitudinal section.
Figure 5:
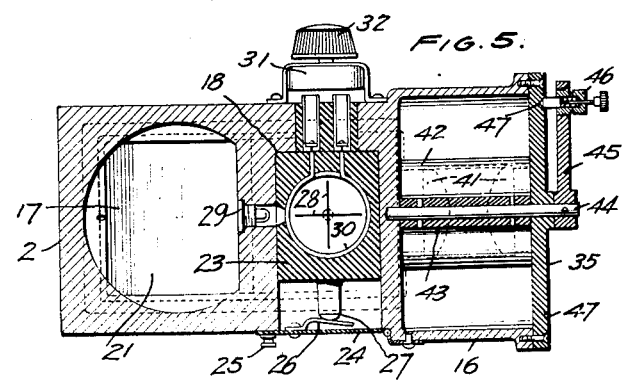
Fig. 5 is a cross section on line 5—5 of Fig. 2.
Figure 8:
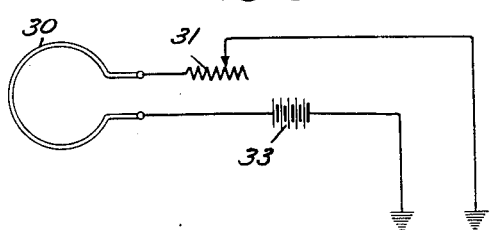
Fig. 8 is a diagrammatic view of the bubble cell heating circuit.

The bubble-cell 23 is mounted in the chamber 18 with the bubble in the focal plane of the lens 13 and hence an image of the bubble is seen together with the image of a distant object viewed through the optical system of the instrument. The bubble-cell is of a conventional and well known construction wherein the bubble moves on the under side of the spherical surface of the top cover glass. The radius of curvature of the bubble cell is so chosen in relation to the focal length of the objective lens as to produce the same amount of movement of the bubble, when the instrument is tilted in the vertical plane of line of sight, as the movement of the object image. This relationship is brought about by having the radius of curvature of the bubble cell equal to the equivalent focal length of the part of the optical system forming an image of the observed object on the bubble cell. Collimation may then be made with the images anywhere in the field. However, a crossmark 28 is provided on the bubble-cell for use as a basic reference mark when taking bearings, as hereinafter explained. The bubble is illuminated by a small electric lamp 29 arranged in the bubble-cell compartment 18 as shown in Figure 2. To maintain or change the size of the bubble, which increases in size at low temperatures due to the contraction of the liquid when cold, there is provided in the bubble-cell a heating element 30, the temperature of which is controlled by a rheostat 31 having an operating knob 32. The heating element and the rheostat are connected in electrical circuit with a battery 33. The installation of the heating element and associated parts is shown in Figure 5 and a wiring diagram of the circuit is shown in Figure 8. Within the bubble-cell chamber and above the bubble-cell, an inclined reflector 34 is mounted to reflect images of the bubble and the observed star or other distant object along the axis of the sight opening 20.

The eye-lens units for observing the images of the object and bubble-cell are enclosed in the drum 16 which has a removable cover plate 35. The cover plate has a sight orifice 36, adapted to be placed in line with the orifice 20 of the bubble-cell chamber, and also has an integrally formed eye-tube 37 over the end of which is arranged an eye-guard 38. Two eye-lens units of different magnification are provided. The lenses 39 of the low power unit are suitably mounted in a cylindrical holder or lens barrel 40 while the lenses 41 of the high power unit are suitably mounted in a similar holder 42. The holders are connected in parallelism to a common hub portion 43 which is pinned to a shaft 44. The shaft extends beyond each end of the hub and is supported at one end within a bearing socket in the base of the drum and at the other end within an opening in the drum cover, the length of the shaft being such that it extends a short distance outwardly of the drum cover. A crank handle 45 is pinned to the outwardly extending portion of the shaft for turning the latter to position either the low power unit 40 or the high power unit 42 in line with the orifices 20 and 36. A spring-pressed detent 46 is provided in the crank handle for engagement in suitably placed notches or seats 47 in the drum cover to hold the selected unit in sighting position.

Figure 6:
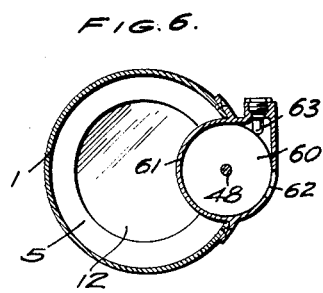
Fig. 6 is a cross section on line 6—6 of Fig. 2.
Figure 4:
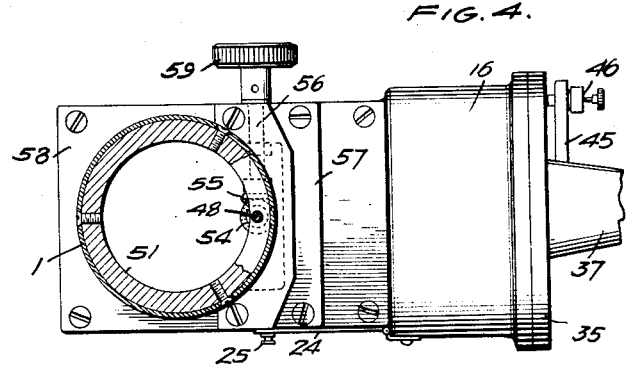
Fig. 4 is a similar cross section on line 4—4 of Figure 2.

The prism 7 is rotatably mounted in its supporting barrel 3 for movement about an axis at right angles to the longitudinal axis of the tube; the plane of incidence—that is, the plane containing the incident ray and the normal to the reflecting surface—being parallel to the tube axis. The means for imparting movement to the prism include a shaft 48 extending lengthwise of the tube on the inside thereof and closely adjacent the wall of the tube. One end of the shaft extends into a spring-housing 49 in the barrel 3 and is engaged by a thrust spring 50. The other end of the shaft is journaled in an annular bearing ring 51 fixed in the tube between the lens barrel 5 and the housing 2. The portion of the shaft which extends into the prism barrel 3 carries a worm 52 engaged by a gear sector 53 which is an integral component of the means for rotatably mounting the prism. At its opposite end the shaft 48 is connected by bevel gears 54 and 55 to a stub shaft 56 disposed at right angles thereto and having a bearing support in a bearing bracket 57. The bracket is fastened to the top cover plate 58 of the housing 2, as shown in Figures 1, 2 and 4 and fits close against the tube which is suitably apertured to receive the shaft 56 and the bevel gear 55. A hand knob 59 is mounted on the outer end of shaft 56 to rotate the latter, and hence shaft 48 also, whereby to change the position of the prism. The measure or degree of angular rotation of prism 7 is indicated by a counter 60 mounted on shaft 48 and calibrated to read elevation directly in degrees and minutes of arc. The counter is enclosed in a housing 61 mounted on the tube 1 over an opening in the latter as shown in Figure 6 and having a window 62 through which the counter is viewed. The counter is illuminated by a lamp 63 mounted in the counter housing 61. Also provided on the shaft 48 is a screw 64 and a nut 65. The nut is arranged within a cut-out in the objective lens barrel 4 to travel on the screw without turning and for a limited distance only. The extent of movement may be such as to permit rotation of the prism sufficiently to move the line of sight between the limits of 5 degrees below the horizon to 95 degrees above. The nut serves as a stop restraining any turning of the shaft beyond the selected limits. Hence, overturning of the shaft, with consequent damage to the worm and sector, is prevented.

The instrument is installed in a vehicle with the instrument tube vertically disposed and rotatably mounted in relatively upper and lower bearing assemblies. These assemblies are so constructed and arranged in the vehicle as to support the instrument with its entrance portion located exteriorly of the vehicle and its eyepiece portion located interiorly of the vehicle. A novel type of installation in a vehicle such as an airplane is illustrated in Figures 1 and 2 wherein is represented an exterior portion 66 of an airplane or other vehicle, an interior portion 67, and a bearing guide in the form of a cup or socket 68. The upper bearing assembly comprises a disk 69 engaging a suitable bearing collar 70 integral with the instrument tube. Disk 69 is supported by suitably placed vibration absorbing means or shock units 71 which may be made of rubber and which in turn transmit the weight of the sextant to a ball sector 72 encircling the tube and slidably received in arcuate bearing socket or guide 68 parallel to the fore-and-aft axis of the airplane. Suitable bolts 73, extending through units 71, loosely connect the disk 69 and the ball sector 72. The lower bearing assembly comprises a sleeved bearing collar 74, the sleeve 75 of which is provided with a bearing scale 76. The sleeved collar is integral with the tube 1 and is supported on a bearing ring 77, riveted to a supporting plate 78 and provided with a depending integral sleeve 79. The collar 74 is provided with gear teeth and, together with the bearing ring 77, is enclosed by a protective cover or casing 80 which may be releasably fastened to the ring by screws or other suitable fasteners. Upon the upper surface of the casing is mounted an index or pointer 81 for reading the scale 76. The plate 78 is supported by suitable shock units 82 (similar to units 71) on an adjustable bracket member 83 to which the plate is loosely connected by bolts 84. The upper and lower bearing assemblies are angularly movable with respect to the airplane about a common axis coinciding with the center of the circle of which the socket 68 is a segment; this center being exterior of the airplane.

Figure 7:
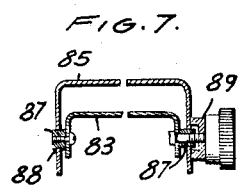
Fig. 7 is a cross section on line 7—7 of Fig. 2.

An attaching bracket member 85, rigidly fastened to the fixed interior portion 67 of the airplane, is coupled to the end portion 86, of the bearing bracket 83 by a shiftable connection constrained to be displaced along an arc concentric with the arcuate bearing socket 68. A suitable form of shiftable connection is shown in Figures 1, 2 and 7 and comprises runners 87 on the sides of the bracket 83 arranged to slide in arcuate guide slots 88 in the sides of the attaching bracket 85. A clamp mechanism 89 is associated with one of the runners for clamping the bracket members 83 and 85 against relative movement. The adjustable bracket and bearing constructions, in addition to supporting the weight of the instrument, facilitate leveling of the instrument when making sextant observations from an airplane since they permit tilting of the instrument in a substantially vertical plane including the fore and aft axis of the airplane. Hence, the instrument can be oriented with respect to the airplane for different altitudes of the craft during normal flight and maintained in level position by clamp 89.

Figure 3:
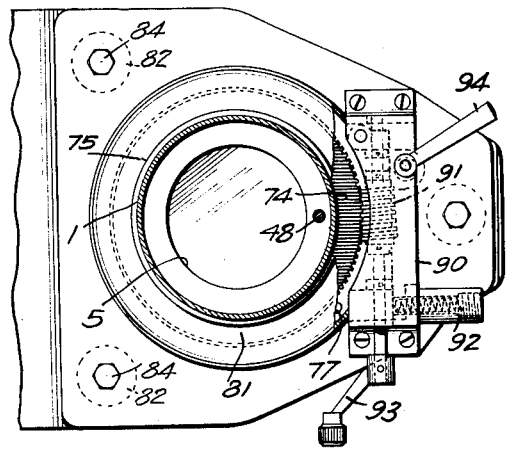
Fig. 3 is a horizontal cross section on line 3—3 of Figure 2.

The instrument is rotatable in the upper and lower bearings to give a complete view in all directions about the axis of the tube. A vernier setting mechanism of the throw-out type is provided for obtaining fine adjustments of the instrument and as shown in Figures 1, 2 and 3 comprises a bearing bracket 90 fastened to the plate 78 and supporting a worm 91 adapted to be moved into and out of mesh with the gear 74 on the tube 1 through a cut-out in the gear case 80. The worm is held in mesh with the gear by a spring device 92 and is rotated by a hand crank 93. In order to make a rapid setting of the instrument in azimuth, the worm is disengaged from the gear by turning the operating lever 94 of the throw-out mechanism and the instrument is then rotated by hand for an approximate or desired setting.

From the foregoing description of the details of the invention it can be seen that observations for determining altitude and azimuth of a celestial body, such as a star, can be readily and conveniently made from a reasonably confined position, as from within a closed airplane. With the low power eyepiece 40 in position the maximum field is visible for initial observation such as would be desirable in order to view an entire celestial constellation. The observer simply looks into the eye-tube 37 and rotates the sextant in azimuth and the entrance prism in altitude until the desired constellation is viewed. Light rays from a selected star of the constellation pass through the cover glass 6 and are reflected by prism 7 to the objective lens 8 and 9. They are brought to a focus at 11 prior to passing through lens 12. Lens 12 converts the rays to parallel pencils which are again brought to a focus at 14 by lens 13 after being reflected by mirrors 21 and 22. At 14, the image of the star and the image of the bubble cell are in the same focal plane and both images are viewed simultaneously by the low power eyepiece 40 after reflection by the mirror 34.

This arrangement of lenses and mirrors gives an erect image of the object with a convenient eye position for observing, both features being of paramount importance in an aircraft sextant. By a rough setting or adjustment of the instrument, the image of the star is brought adjacent the image of the bubble. After an approximate setting thus made, the high power eyepiece 42 is moved into position for viewing the object image and the bubble. A vernier setting of the instrument is then made for positioning the object image in coincidence with the image of the bubble and for an accurate measurement of altitude. The altitude angle of the star is read from the counter 60 and its relative bearing is read from the azimuth scale 76.

The instrument may also be used in much the same manner as pelorus for measuring bearings. In order to measure such bearings the instrument is rotated in azimuth until the image of a distant object is seen through the eyepiece on the vertical line of the crossmark 28. The bearing of the object from the airplane is then read on scale 76. In a similar manner the image of a star may be placed on the intersection of the crossmark of the bubble cell and a determination of the relative bearing of the star is then made by reference to the azimuth scale. This reading may be valuable when used for steering purposes or for the correction of the magnetic compass.

The instrument also provides means by the use of which a course can be steered or a heading preserved; such being accomplished by the observation through the instrument of a celestial body such as the star Polaris, while the craft is proceeding on its course or heading. Any deviation of the craft from its course or heading is corrected by subsequently turning the craft either left or right in order to relocate or to maintain the image of the star in coincidence with a suitable marking on the reticle or bubble cell of the instrument.

Having thus described the invention, what is claimed as new is:

1. A sextant for making observations on exterior objects from within a closed dirigible vehicle and comprising a sighting device having an entrance portion exterior of said vehicle and an eyepiece portion interior of said vehicle, said sighting device being mounted to rotate about its longitudinal axis, horizontal reference means including a bubble movable in an arc having a given radius of curvature, adjustable reflector means associated with said entrance portion for reflecting the image of an observed object into said sighting device, optical means for transmitting said image into the focal plane of said bubble and an image of said horizontal reference means and said object to said eyepiece, the equivalent focal length of the part of said optical means which transmits the image of the object into the focal plane of said bubble being equal to the said given radius of curvature of said bubble, means responsive to adjustment of the reflector means for indicating—when said image and reference means coincide—the altitude of said observed object, and means responsive to a rotation of said sighting device for indicating the relative bearing of said observed object.

2. A panoramic sextant for making observations on exterior objects from within a closed aircraft and comprising a sighting device mounted on the aircraft for adjustment through horizontal angles, said device having an entrance portion exterior of the aircraft and an eyepiece interior of the aircraft, horizontal reference means movable in an arc having a given radius in response to tilt of said aircraft, a reflector at the entrance portion of the device for reflecting in the sighting device an image of an observed exterior object, said reflector being adjustable for moving the line of sight through vertical angles, optical means for transmitting to the focal plane of the horizontal reference means an image of the observed object and to the eyepiece the said image of the observed object and an image of the horizontal reference means, the equivalent focal length of the part of said optical system which transmits the image of the observed object to the focal plane of the horizontal reference means being equal to said given radius of curvature of said reference means, and means responsive to adjustments of the sighting device and the reflector for indicating the position of the observed object in terms of azimuth and altitude.

3. A sextant for making observations on exterior objects from within a closed space and comprising a vertical sighting tube having an entrance portion exterior of the space and an eyepiece portion interior of the space, said tube being rotatable about its vertical longitudinal axis, an adjustable reflector at the entrance portion of the tube for reflecting into the tube the image of an observed object, horizontal reference means having a given radius of tilt, optical means for transmitting to the focal plane of the horizontal reference means an image of the observed object and to the eyepiece portion the said image of the object and an image of the reference means, the equivalent focal length of the part of said optical system which transmits the image of the observed object to the focal plane of the horizontal reference means being equal to the said given radius, means operable for rotating the tube, means operable for adjusting the reflector to bring the image of the object into coincidence with the image of the reference means, and means responsive to the adjustment of the reflector for indicating the altitude of the object when the image of the object and the image of the reference means coincide.

4. A panoramic sextant for making observations on exterior objects from within a closed vehicle and comprising a tube extending vertically of the vehicle and adjustable through horizontal angles, said tube having one end exterior of the vehicle and its other end interior of the vehicle, a reflector in the tube at the exterior end thereof for reflecting into the tube the image of an observed object, said reflector being adjustable through vertical angles, an eyepiece at the interior end of the tube, horizontal reference means tiltable in an arc having a given radius, an optical system for transmitting to the focal plane of the horizontal reference means an image of the observed object and to the said eyepiece the said image of the observed object and an image of the said horizontal reference means, the equivalent focal length of the part of said optical system which transmits an image of the observed object to the focal plane of the horizontal reference means being equal to the said given radius, means responsive to the adjustments of the tube and the reflector for indicating the position of the observed object in terms of azimuth and altitude and a supporting mount for the said tube having an adjustable connection with the vehicle whereby it is adjustable for leveling the sextant.

5. An optical instrument for making observations on exterior objects from within a closed space comprising an optical system having an entrance portion exterior of the said space and an eyepiece portion interior of the said space and vertically spaced bearings supporting the optical system and in which the said system is mounted to rotate about a substantially vertical axis, said bearings being movable with respect to the said space about a common horizontal axis to enable tilting of the optical system in a substantially vertical plane.

6. An optical instrument for making observations on exterior objects from within an aircraft comprising an optical system having an entrance portion exterior of the aircraft and an eyepiece portion interior of the aircraft, and vertically spaced bearings carried by the aircraft for supporting the said optical system and in which the said system is mounted to rotate about a substantially vertical axis, said bearings being angularly movable about a common horizontal axis substantially perpendicular to the plane of the fore-and-aft axis of the aircraft.

7. An optical instrument for making observations on exterior objects from within an aircraft, comprising an optical system having an entrance portion exterior of the aircraft and an eyepiece portion interior of the aircraft, and vertically spaced bearings on the aircraft for supporting the said optical system and in which the said system is mounted to rotate about a substantially vertical axis, said bearings being angularly movable relative to the aircraft about a common horizontal axis exterior of the aircraft and substantially perpendicular to the vertical plane of the fore-and-aft axis of the aircraft.

8. An optical instrument for making observations on exterior objects from within an aircraft comprising an optical system having an entrance portion exterior of the aircraft and an eyepiece portion interior of the aircraft, horizontal reference means disposed in said optical system, means connecting the optical system and the aircraft and including vertically spaced bearings in which the said optical system is mounted to rotate about a substantially vertical axis, said bearings being angularly adjustable with respect to the aircraft about a common axis exterior of the aircraft and substantially perpendicular to the vertical plane of the fore-and-aft axis of the aircraft, and releasable means for securing said bearings in the position to which adjusted.

9. An optical instrument for making observations on exterior objects from within an aircraft comprising an optical system having an entrance portion exterior of the aircraft and an eyepiece portion interior of the aircraft, horizontal reference means in said optical system, a support structure connecting the optical system and the aircraft and including vertically spaced adjustable bearing in which the said optical system is mounted to rotate about a vertical axis and fixed guides supporting the said bearings, said bearing being angularly adjustable in said guides about a common axis exterior of the aircraft and substantially normal to the vertical plane of the fore-and-aft axis of the aircraft whereby to facilitate leveling of the instrument, and clamp means associated with one of the guides and operable to restrain relative movement between the said guide and bearings.

10. A sextant for making observations of exterior objects from within a vehicle and having in combination an optical system provided with an entrance portion exterior of the vehicle and an eyepiece portion interior of the vehicle, horizontal reference means in the optical system, and means connecting the optical system and the aircraft and including a bearing in which the optical system is mounted to rotate about a vertical axis and a fixed arcuate guide supporting the said bearing, said bearing being adjustable in said guide angularly about an axis normal to the vertical plane of the fore-and-aft axis of the vehicle.

11. A sextant for making observations on exterior objects from within a vehicle and comprising a sighting tube having one end exterior of the vehicle and the opposite end interior of the vehicle, an optical system in said tube including an adjustable reflector at the outer end of the tube and an eyepiece at the inner end of the tube, horizontal reference means in the said optical system, and means connecting the tube and the vehicle and including upper and lower bearing assemblies in which said tube is mounted to rotate with its longitudinal axis vertical, said bearing assemblies being adjustably angularly about a common axis normal to the plane of the fore-and-aft axis of the vehicle.

12. A sextant as claimed in claim 11 wherein the said bearing assembly comprises a bearing collar integral with the tube, a ball sector slidably received in the fixed guide, a disk loosely connected with the ball sector and rotatably supporting the said bearing collar, and vibration-absorbing means between the disk and the sector.

13. A sextant as claimed in claim 11 wherein the lower bearing assembly comprises a bearing collar integral with the said tube, a two part bracket consisting of an attaching unit fastened to a fixed portion of the vehicle and a support unit coupled to the attaching unit by a shiftable connection constrained to be displayed along an arc concentric with the common axis, a plate rotatably supporting the said bearing collar and loosely connected with the support unit of the two part bracket, and vibration-absorbing means between the said plate and support unit.

14. An instrument for making observations of exterior objects from within an enclosed vehicle comprising an optical system including an eyepiece for viewing images in a given focal plane, a reflector for sighting an object, and optical means forming an image of said object in said focal plane, horizontal reference means disposed in said optical system in said given focal plane so that its image is viewed through said eyepiece, said reference means being tiltable in an arc having a radius equal to the equivalent focal distance of said optical means and a supporting mount for attaching said optical system to the vehicle with the said reflector exterior of the vehicle and the said eyepiece interior of the vehicle, said mount including a bearing in which said optical system is turnable about a vertical axis and also tiltable about a horizontal axis.

15. An instrument for making observations of exterior objects from within an enclosed vehicle comprising an optical system including an eyepiece for viewing images in a given plane, a reflector for sighting an object, and optical means forming an image of said object in said focal plane, horizontal reference means disposed in said optical system so that its image is viewed through said eyepiece, said reference means being movable in an arc having a radius equal to the equivalent focal distance of said optical means and a supporting mount for attaching said optical system to the vehicle with the said reflector exterior of the vehicle and the eyepiece interior of the vehicle, said mount including a bearing in which said optical system is freely turnable about a vertical axis and also tiltable in a substantially vertical plane including the fore and aft axis of the vehicle.

16. An instrument comprising an optical sighting device including a rotatable tube, a support for the tube including vertically spaced horizontal members through which the said tube extends vertically, vibration absorbing means between said members, a bearing ring fixed on the upper surface of the upper member, a bearing collar fixed to said tube and supported on said ring, and a casing covering the said ring and collar and releasably fastened to the said ring.

17. An instrument comprising an optical sighting device including a rotatable tube, a pair of vertically spaced horizontal support members through which the said tube extends vertically, said members being loosely connected together for relative movement, vibration absorbing means between said members, a bearing ring free on said tube and fixed on the outer surface of the upper member, a bearing collar fixed on the tube and supported by the said ring on which it is adapted to turn said collar having an upstanding sleeve provided with a bearing scale, a removable casing extending over the said ring and collar and being releasably fastened to the ring, said casing having an index for reading the said scale, and means operable for rotating said tube including a rotatable hand-operated unit on the said upper member and geared to the said collar.

18. A panoramic sextant for making observations on exterior objects located anywhere above the horizon from within a closed vehicle, comprising a vertically disposed sighting tube having an objective end positioned exteriorly of and an eyepiece end interiorly of the vehicle, means for mounting said instrument on said vehicle, tiltable means associated with said objective end for reflecting an image of an observed object into said tube, a level-bubble constituting a horizontal reference means movable in an arc having a given radius, optical means for transmitting said image upwardly to the focal plane of said horizontal reference means from where it is observable through said eyepiece end together with an image of said horizontal reference means, the equivalent focal length of said optical means being equal to said given radius whereby said two images after having been brought into coincidence will move in the same sense and by the same amount, and the angle of tilt of said tiltable means is a measure of the altitude of the observed object.

CARL J. CRANE.
SAMUEL M. BURKA.